Oct. 9, 1956      N. E. SCHMIDTKE      2,765,956

DISPENSING MEANS

Filed July 25, 1955      2 Sheets-Sheet 1

NORMAN E. SCHMIDTKE
INVENTOR.

BY Lyon & Lyon

ATTORNEYS

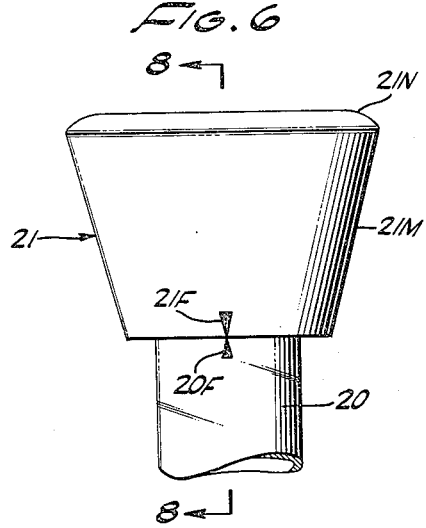
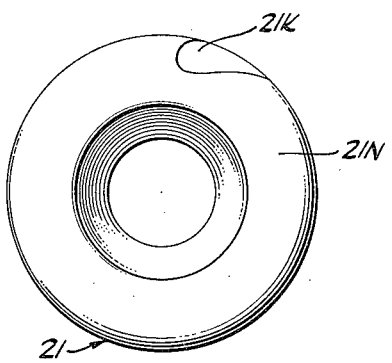
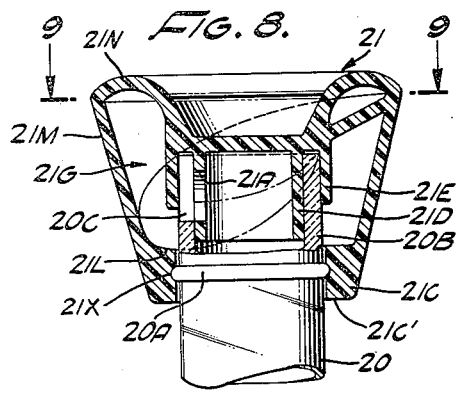
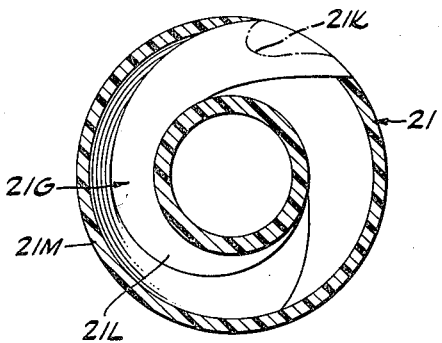
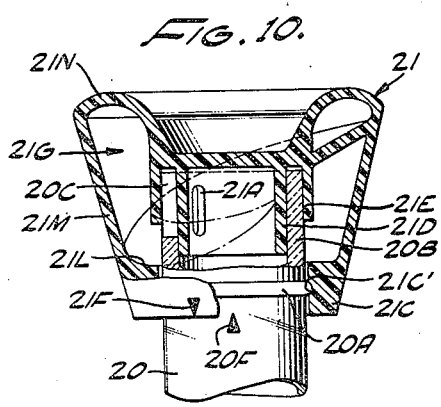

United States Patent Office 2,765,956

Patented Oct. 9, 1956

2,765,956

DISPENSING MEANS

Norman E. Schmidtke, Los Angeles, Calif.

Application July 25, 1955, Serial No. 523,982

12 Claims. (Cl. 222—41)

The present invention relates to improved means and techniques for metering and dispensing materials from a container.

The arrangement disclosed herein is a metering and dispensing cap adapted to be quickly attached to and detached from a container of liquid or granular materials. The cap is adapted for use with a special type of container having a flanged portion disposed below a tubular portion so as to permit the cap to be rotatably mounted on the container, such that apertured portions in the cap and tubular portion of the container may be brought into and out of registry to correspondingly permit a dispensing operation or to seal the container. The cap, in both forms of the invention illustrated herein, is a unitary body of elastic material, of pleasing shape and form, while yet functioning efficiently for its intended purposes.

A general object of the present invention is to provide an improved cap and container combination having the general features indicated above.

Another general object of the present invention is to provide a cap for use with containers for achieving the above-indicated results.

A specific object of the present invention is to provide improved dispensing means of this character in which a predetermined volume of fluid or granular substance is metered out onto a chamber in the cap upon tilting the container in a predetermined direction, and such metered amount of material is dispensed upon movement of the container in a different direction.

Another specific object of the present invention is to provide dispensing means of this character which combines pleasing appearance with efficient functioning.

Another specific object of the present invention is to provide a dispensing cap which is characterized by its simplicity and which may be made relatively inexpensive in accordance with present day mass production techniques.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figures 6–10 illustrate a second form of the present invention; Figure 6 is required to be moved to two different positions for first effecting a metering and then a dispensing operation.

Figure 1 is a view in side elevation of an arrangement embodying features of the present invention.

Figure 2 is a sectional view taken substantially on the line 2—2 of Figure 1.

Figure 3 is a sectional view taken substantially on the line 3—3 of Figure 2.

Figure 4 is a view partly in section and partly in elevation corresponding generally to Figure 2, but in this instance the cap is rotated to its sealing position from its dispensing position illustrated in Figure 2.

Figure 5 illustrates the manner in which apparatus embodying the present invention is manipulated to first perform a metering operation and then a dispensing operation.

Figure 6 is a view in side elevation of a second form of dispensing means embodying features of the present invention.

Figure 7 is a top plan view of the arrangement shown in Figure 6.

Figure 8 is a sectional view taken on the line 8—8 of Figure 6.

Figure 9 is a sectional view taken on the line 9—9 of Figure 8.

Figure 10 is a part elevation and part sectional view which corresponds to Figure 8, but in this instance the cap is rotated to a sealing position from the dispensing position illustrated in Figure 8.

Referring to Figures 1–4, the container 10 for liquid, such as, for example, liquid detergents, comprises generally a cylindrical body 10A having a flanged portion 10B which defines the upper edge of the cylindrical body 10A. Also, the container 10 includes a centrally disposed tubular portion 10C having a closed upper end 10D and an apertured portion 10E in the circular wall of such tubular portion. This tubular portion 10C is, of course, joined to the body portion 10 by the open-ended top portion 10F of the container. The container 10 and the tubular portion is thus in the form of a can and may be fabricated from the same type of material as used in the present day fabrication of "tin" cans.

Figure 1:
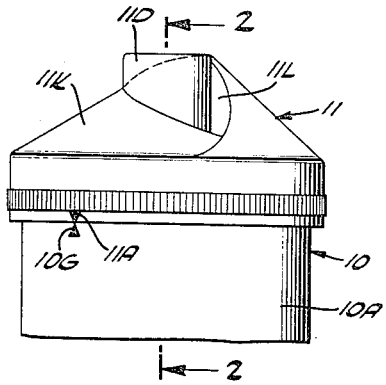
Figures 1–4 illustrate one form of the present invention.
Figure 3:
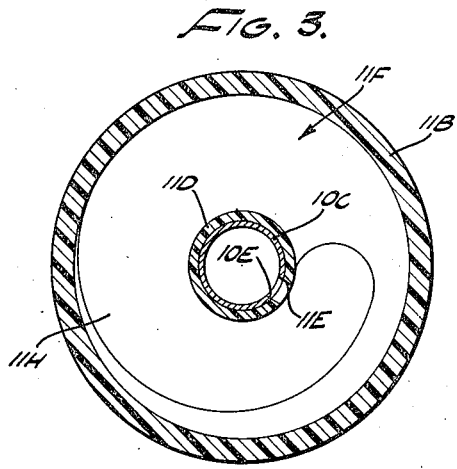
Figure 4:
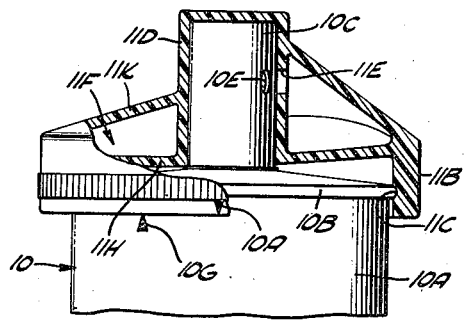

The cap 11 comprises a single unitary body of elastic material which is adapted to be quickly attached to the container 10 and to be rotated on the can so that the index mark 11A on the cap may be brought into registry with the index mark 10G on the can, as shown in Figure 1, or displaced therefrom, as illustrated in Figure 4.

Figure 2:
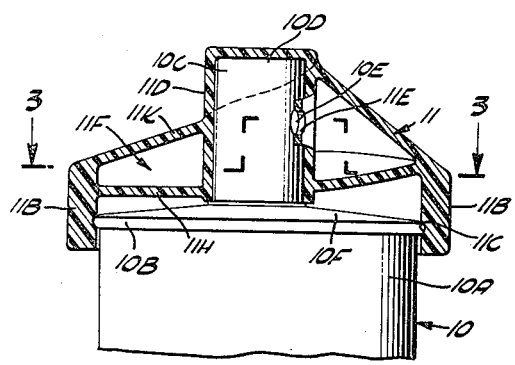

The cap 11 comprises generally a circular member having an annular elastic flanged portion 11B with a grooved portion 11C therein adapted to resiliently engage the flanged portion 10B of the container. The cap 11 also includes a tubular portion 11D adapted to snugly engage the container tubular portion 10C, and such tubular portion 11D has an apertured portion 11E therein which, in the position illustrated in Figures 1 and 2, is in registry with the container apertured portion 10E to allow material to be dispensed into the cap chamber 11F upon tilting the assembly to the position illustrated in phantom lines in Figure 5.

The aforementioned chamber 11F is an open-ended chamber and is defined generally by a bottom wall 11H and a top wall 11K, both of which spiral generally upwardly in the direction of the opening 11L of the chamber. This chamber 11F is defined also in part by the outer wall of a portion of the tubular portion 11D, as well as a portion of the flanged portion 11B, as illustrated in Figure 2.

Figure 5:
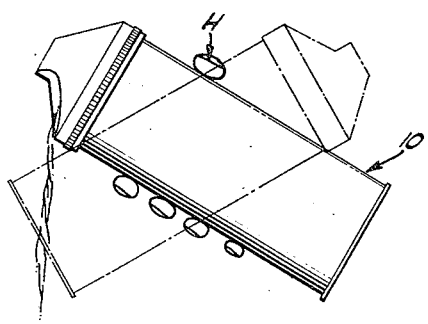
Figure 5 illustrates the positions in which the container of either Figure 1

It is noted that the opening 11L of the chamber 11F is positioned in a radial sense different from the apertured portion 11E, and, as a matter of fact, the opening and the apertured portion are diametrically opposite so that the assembly shown in Figure 5 is required to be moved in opposite directions, as indicated in Figure 5, to first perform a metering operation and then a dispensing operation, using the operator's hand H to tilt the assembly first in one direction and then in the opposite direction. After the dispensing operation, it may be desired to seal the container, and, in such case, the cap 11 is rotated to, for example, the position shown in Figure 4 wherein the index marks 10A and 10G are no longer in registry.

In the form of the invention illustrated in Figures 6–10, the principle of operation is essentially the same except for those differences resulting from the differences in structure which are now described. In Figure 6 the container is in the form of a bottle, as for example a liquor bottle, having a glass neck 20 with a flanged portion 20A on the neck disposed below the tubular end 20B of the bottle. In this instance the apertured portion in the tubular portion 20B is in the form of a notched portion 20C which may be placed in registry with the apertured portion 21A of the cap 21.

The cap comprises preferably a single unitary body of elastic material with a flanged portion 21C having a grooved portion 21X therein adapted to resiliently engage the flanged portion 20A so that the cap may be conveniently and quickly attached to and detached from the neck 20.

The cap 21 has a pair of annular flanged portions 21D and 21E adapted respectively to snugly engage the inner and outer tubular surfaces of the bottle end 20B, and the apertured portion 21A is in the inner portion 21D. When the apertured portions 20C and 21A are aligned, as indicated by the aligned index marks 21F and 20F, as illustrated in Figure 6, fluid may be dispensed into the annular cap chamber 21G, which is an open-ended chamber having the opening or mouth 21K. The chamber 21G in this instance is defined by a bottom wall 21L that spirals generally upwardly in the direction of the opening 21K, as well as by the truncated conical wall 21M and the arcuate crowned portion 21N. Further, such chamber 21G is defined in part also by the outer surface of the bottle neck portion 20B. Here again, the opening 21K of the chamber is disposed in a radial sense different from the apertured portion 21A, so that the assembly must be successively tilted in opposite directions, as indicated in Figure 5, to first produce a metering operation and then a dispensing operation. Here again, if it is desired to seal the container after a dispensing operation, the cap 21 is rotated to a position illustrated in Figure 10 wherein the index marks 21F and 20F are no longer in registry.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In combination, a container having a flanged portion, a tubular portion extending above said flanged portion, said tubular portion having an apertured portion, a metering and dispensing cap of elastic material having an annular grooved portion engageable with said flanged portion, said cap having a centrally disposed tubular portion adapted to snugly engage the container tubular portion, said cap having an integrally formed portion defining an open-ended chamber substantially surrounded by the cap tubular portion, said cap tubular portion having an apertured portion which may be brought into registry with the container tubular portion, whereby material may be dispensed from said container into said chamber, said cap being rotatable on said container to place said container apertured portion and cap apertured portions into registry, cooperating indexing means on said cap and said container for indicating when said apertured portions are in registry, the open end of said chamber being angularly disposed in a radial sense from the apertured portion in the cap tubular portion.

2. The combination set forth in claim 1 in which said flanged portion defines the upper edge of a cylindrical container.

3. The combination as set forth in claim 1 in which said flanged portion is disposed on the neck portion of a bottle.

4. The combination as set forth in claim 1 in which the open end of said chamber is disposed above the apertured portion of the cap tubular portion.

5. The combination as set forth in claim 1 in which the top of said cap tubular portion corresponds substantially to the top of the cap chamber.

6. The combination as set forth in claim 1 in which the top of the tubular portion terminates substantially below the top of the chamber.

7. A metering and dispensing cap for a container comprising an elastic generally circular body with an annular flanged portion with an annular grooved portion therein adapted to be quickly attached to and detached from said container, said body having a centrally disposed closed-ended tubular portion with the axis of said tubular portion corresponding to the axis of said flanged portion, said body having a portion thereof defining an open-ended chamber which generally surrounds said tubular portion, said tubular portion having an apertured portion in its circular wall to place said tubular portion in communication with said chamber, the open end of said chamber being radially offset with respect to said apertured portion.

8. A cap as set forth in claim 7 in which the closed end of said tubular portion corresponds generally to the top of the chamber.

9. A cap as set forth in claim 7 in which the closed end of said tubular portion is disposed substantially below the top of the chamber.

10. A cap as set forth in claim 7 in which the portions defining the upper and lower walls of said chamber each comprises generally spiral walls that spiral upwardly in the general direction of the opening of the chamber.

11. A cap as set forth in claim 7 in which the portion defining the bottom wall of said chamber comprises generally a spiral wall that spirals upwardly in the general direction of the opening of the chamber.

12. A metering and dispensing cap for a container comprising an elastic generally circular body with an annular flanged portion with an annular grooved portion therein adapted to be quickly attached to and detached from said container, said body having a centrally disposed closed-ended tubular portion with the axis of said tubular portion corresponding to the axis of said flanged portion, said body having a portion thereof defining an open-ended chamber which generally surrounds said tubular portion, said tubular portion having an apertured portion in its circular wall to place said tubular portion in communication with said chamber, the open end of said chamber being radially offset with respect to said apertured portion, the portion defining the bottom wall of said chamber comprising generally a spiral wall that spirals upwardly in the general direction of the opening of the chamber, the portion defining the upper wall of said chamber comprising an annular crowned wall with an opening therein defining the opening of said chamber.

No references cited.